(12) United States Patent
Ogura (10) Patent No.: US 7,255,005 B2
(45) Date of Patent: Aug. 14, 2007

(54) PIEZOELECTRIC VIBRATING GYRO ELEMENT AND GYRO SENSOR

(75) Inventor: Seiichiro Ogura, Minowa-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/330,518

(22) Filed: Jan. 11, 2006

(65) Prior Publication Data

US 2006/0162446 A1 Jul. 27, 2006

(30) Foreign Application Priority Data

Jan. 24, 2005 (JP) ............................. 2005-015457

(51) Int. Cl.
*G01P 9/00* (2006.01)
*G01C 19/00* (2006.01)
(52) U.S. Cl. .................. 73/504.12; 73/504.16
(58) Field of Classification Search ............ 73/504.04, 73/504.12, 504.14, 504.15, 504.16; 310/370
See application file for complete search history.

(56) References Cited

U.S. PATENT DOCUMENTS

| | | | | |
|---|---|---|---|---|
| 5,476,008 A * | 12/1995 | Pinson | ............. | 73/504.16 |
| 6,439,051 B2 * | 8/2002 | Kikuchi et al. | ........... | 73/504.12 |
| 6,698,292 B2 * | 3/2004 | Kikuchi | ............. | 73/662 |
| 7,043,986 B2 * | 5/2006 | Kikuchi et al. | ........... | 73/504.12 |

FOREIGN PATENT DOCUMENTS

JP 2001-012955 1/2001

* cited by examiner

*Primary Examiner*—Helen Kwok
(74) *Attorney, Agent, or Firm*—Anderson Kill & Olick, PC (57) ABSTRACT

A piezoelectric vibrating gyro element is constructed by crystal and includes at least in the same plane a base portion; a pair of vibrating arms for detection extended out from the base portion to both sides in a straight line shape, and having groove portions; a weight portion connected to the tip of each of the vibrating arms for detection; a pair of connecting arms extended out from the base portion to both the sides in directions perpendicular to the vibrating arms for detection; pairs of vibrating arms for driving each extended out from the tip portion of each of the connecting arms to both the sides perpendicularly to this tip portion, and having groove portions; and a weight portion connected to the tip of each of the vibrating arms for driving; wherein, when the vibrating arm for driving is set to Ld in length and Wd in width, and the vibrating arm for detection is set to Lp in length and Wp in width, and the connecting arm is set to Lc in length and Wc in width, the piezoelectric vibrating gyro element is constructed so as to form the following formulas $100 \leq Wd/Ld^2 \leq 580$, $135 \leq Wp/Lp^2 \leq 800$ and $65 \leq Wc/Lc^2 \leq 390$.

10 Claims, 9 Drawing Sheets

FIG. 4A TYPE 1

FIG. 4B TYPE 2

FIG. 5A TYPE 3

FIG. 5B TYPE 4

FIG. 5C TYPE 5

|  | TYPE 1 | TYPE 2 | TYPE 3 | TYPE 4 | TYPE 5 |
|---|---|---|---|---|---|
| Cd | 200 | 220 | 930 | 1140 | 990 |
| Cp | 150 | 150 | 870 | 1025 | 875 |
| Cc | 300 | 310 | 545 | 645 | 550 |

(UNIT: m/s)

PIEZOELECTRIC VIBRATING GYRO ELEMENT AND GYRO SENSOR

BACKGROUND

1. Technical Field

The present invention relates to a piezoelectric vibrating gyro element and a gyro sensor.

2. Related Art

In recent years, the gyro sensor having the piezoelectric vibrating gyro element stored in a container is largely used as a manual moving correction of an image pickup device, and posture control of a mobile navigation system of a vehicle, etc. using a GPS satellite signal.

Figure 1:
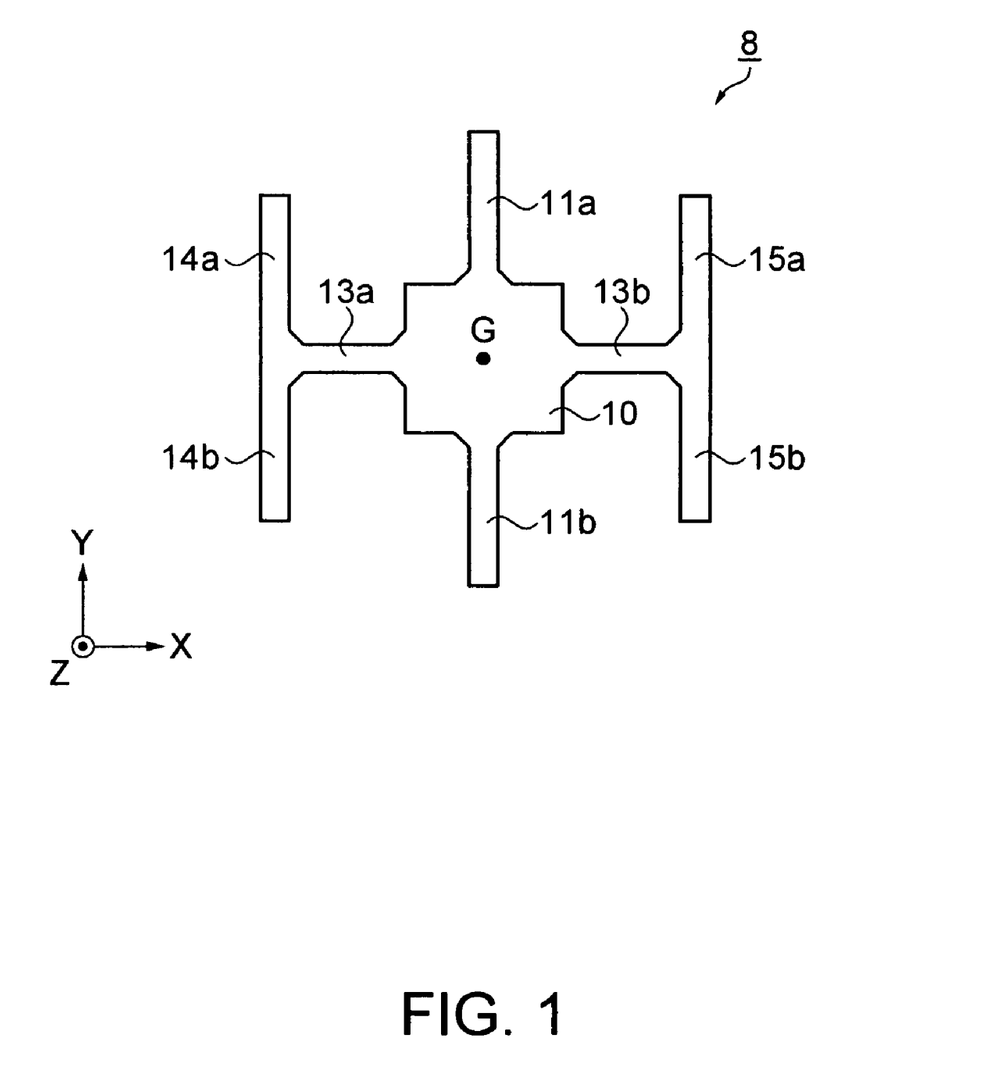
FIG. 1 is a schematic plan view showing a double T-type vibrating gyro element as a piezoelectric vibrating gyro element.

For example, a so-called double T-type vibrating gyro element is known as the piezoelectric vibrating gyro element in JP-A-2001-12955 and FIG. 1. In this double T-type vibrating gyro element, a detecting vibrating system extended out of a central base portion, and a driving vibrating system of about the T-type are arranged in the central base portion so as to be symmetrical leftward and rightward.

In this piezoelectric vibrating gyro element or the gyro sensor, it is necessary to suitably change the lengths and widths of a vibrating arm for driving, a vibrating arm for detection and a connecting arm to make the piezoelectric vibrating gyro element or the gyro sensor compact and mount the piezoelectric vibrating gyro element or the gyro sensor to a limited space.

In the former piezoelectric vibrating gyro element, the lengths and widths of the vibrating arm for driving and the vibrating arm for detection are equally designed and their respective vibrating frequencies are closely conformed to each other. However, the vibrating frequency of the vibrating arm for detection is influenced by the vibration of the connecting arm and the vibration of the base portion. Therefore, it was necessary to consider the vibrations of the connecting arm and the base portion in the design of the vibrating arm for detection.

Therefore, when the lengths and widths of the vibrating arm for driving and the vibrating arm for detection are changed so as to be different from each other, a suitable construction must be obtained by repeating many vibrating simulations and trials so that much time is consumed.

SUMMARY

To solve the above problem, the present inventors have noticed that the lengths and widths of the respective vibrating arms relate to the respective vibrating frequencies. It has been intended to find the relation of the length and width of each vibrating arm able to obtain preferable characteristics as the piezoelectric vibrating gyro element, and easily change the design.

An advantage of some aspects of the invention is to provide a gyro element for easily changing the design while maintaining the characteristics of the piezoelectric vibrating gyro element. Further, another advantage of some aspects of the invention is to provide a gyro sensor mounting this piezoelectric vibrating gyro element of preferable characteristics.

To achieve the above advantages, a piezoelectric vibrating gyro element according to an aspect of the invention is constructed by crystal and comprises at least in the same plane:

a base portion;

a pair of vibrating arms for detection extended out from the base portion to both sides in a straight line shape, and having groove portions;

a weight portion connected to the tip of each of the vibrating arms for detection;

a pair of connecting arms extended out from the base portion to both the sides in directions perpendicular to the vibrating arms for detection;

pairs of vibrating arms for driving each extended out from the tip portion of each of the connecting arms to both the sides perpendicularly to this tip portion, and having groove portions; and a weight portion connected to the tip of each of the vibrating arms for driving;

wherein, when the vibrating arm for driving is set to Ld in length and Wd in width, and the vibrating arm for detection is set to Lp in length and Wp in width, and the connecting arm is set to Lc in length and Wc in width, the piezoelectric vibrating gyro element is constructed so as to form the following formulas $$100 \leq Wd/Ld^2 \leq 580$$

$$135 \leq Wp/Lp^2 \leq 800$$

$$65 \leq Wc/Lc^2 \leq 390.$$

A piezoelectric vibrating gyro element according to another aspect of the invention is constructed by crystal and comprises at least in the same plane:

a base portion;

a pair of vibrating arms for detection extended out from the base portion to both sides in a straight line shape;

a weight portion connected to the tip of each of the vibrating arms for detection;

a pair of connecting arms extended out from the base portion to both the sides in directions perpendicular to the vibrating arms for detection;

pairs of vibrating arms for driving each extended out from the tip portion of each of the connecting arms to both the sides perpendicularly to this tip portion; and a weight portion connected to the tip of each of the vibrating arms for driving;

wherein, when the vibrating arm for driving is set to Ld in length and Wd in width, and the vibrating arm for detection is set to Lp in length and Wp in width, and the connecting arm is set to Lc in length and Wc in width, the piezoelectric vibrating gyro element is constructed so as to form the following formulas $$90 \leq Wd/Ld^2 \leq 540$$

$$135 \leq Wp/Lp^2 \leq 790$$

$$65 \leq Wc/Lc^2 \leq 380.$$

A piezoelectric vibrating gyro element according to a further aspect of the invention is constructed by crystal and comprises at least in the same plane:

a base portion;

a pair of vibrating arms for detection extended out from the base portion to both sides in a straight line shape, and having groove portions of lengths of about half the length of the base portion;

a pair of connecting arms extended out from the base portion to both the sides in directions perpendicular to the vibrating arms for detection; and pairs of vibrating arms for driving each extended out from the tip portion of each of the connecting arms to both the sides perpendicularly to this tip portion, and having groove portions of lengths of about half the length of the tip portion;

wherein, when the vibrating arm for driving is set to Ld in length and Wd in width, and the vibrating arm for detection is set to Lp in length and Wp in width, and the connecting arm is set to Lc in length and Wc in width, the piezoelectric vibrating gyro element is constructed so as to form the following formulas $$22 \leq Wd/Ld^2 \leq 125$$

$$23 \leq Wp/Lp^2 \leq 135$$

$$37 \leq Wc/Lc^2 \leq 215.$$

A piezoelectric vibrating gyro element according to a still further aspect of the invention is constructed by crystal and comprises at least in the same plane:

a base portion;

a pair of vibrating arms for detection extended out from the base portion to both sides in a straight line shape, and having groove portions until its tip portion;

a pair of connecting arms extended out from the base portion to both the sides in directions perpendicular to the vibrating arms for detection; and pairs of vibrating arms for driving each extended out from the tip portion of each of the connecting arms to both the sides perpendicularly to this tip portion, and having groove portions until its tip portion; and wherein, when the vibrating arm for driving is set to Ld in length and Wd in width, and the vibrating arm for detection is set to Lp in length and Wp in width, and the connecting arm is set to Lc in length and Wc in width, the piezoelectric vibrating gyro element is constructed so as to form the following formulas $$18 \leq Wd/Ld^2 \leq 105$$

$$20 \leq Wp/Lp^2 \leq 115$$

$$32 \leq Wc/Lc^2 < 185.$$

A piezoelectric vibrating gyro element according to a still further aspect of the invention is constructed by crystal and comprises at least in the same plane:

a base portion;

a pair of vibrating arms for detection extended out from the base portion to both sides in a straight line shape;

a pair of connecting arms extended out from the base portion to both the sides in directions perpendicular to the vibrating arms for detection; and pairs of vibrating arms for driving each extended out from the tip portion of each of the connecting arms to both the sides perpendicularly to this tip portion; and wherein, when the vibrating arm for driving is set to Ld in length and Wd in width, and the vibrating arm for detection is set to Lp in length and Wp in width, and the connecting arm is set to Lc in length and Wc in width, the piezoelectric vibrating gyro element is constructed so as to form the following formulas $$20 \leq Wd/Ld^2 \leq 120$$

$$23 \leq Wp/Lp^2 \leq 135$$

$$37 \leq Wc/Lc^2 \leq 215.$$

In accordance with the above piezoelectric vibrating gyro elements, if the length and width of each vibrating arm are set within the range of the above-referenced relation of the length and width of each of the vibrating arms, a preferable piezoelectric vibrating gyro element can be provided while the piezoelectric vibrating gyro element is easily changed in design and the characteristics of the piezoelectric vibrating gyro element are maintained. Further, the piezoelectric vibrating gyro element can be also easily made compact.

A gyro sensor according to an aspect of the invention comprises:

the above piezoelectric vibrating gyro element;

a driving circuit for operating and vibrating the piezoelectric vibrating gyro element; and a detecting circuit for detecting a detecting vibration caused in the piezoelectric vibrating gyro element when an angular velocity is applied to the piezoelectric vibrating gyro element.

In accordance with this construction, it is possible to provide a gyro sensor mounting the above piezoelectric vibrating gyro element and able to preferably detect the angular velocity.

BRIEF DESCRIPTION OF THE DRAWINGS

The invention will be described with reference to the accompanying drawings, wherein like numbers reference like elements.

DESCRIPTION OF EXEMPLARY EMBODIMENTS

The operation of a double T-type vibrating gyro element as a piezoelectric vibrating gyro element will be explained prior to a detailed explanation of this embodiment mode.

FIG. 1 is a schematic plan view showing a typical double T-type vibrating gyro element.

The piezoelectric vibrating gyro element 8 is formed by crystal as a piezoelectric material. The crystal has an X-axis called an electric axis, a Y-axis called a mechanical axis, and a Z-axis called an optical axis. The piezoelectric vibrating gyro element 8 has a predetermined thickness in the Z-axis direction, and is formed within an XY plane.

The piezoelectric vibrating gyro element 8 has a pair of vibrating arms 11a, 11b for detection extended out of a base portion 10 in a straight line shape on both the upper and lower sides within FIG. 1, and also has a pair of connecting arms 13a, 13b extended out of the base portion 10 on both the left and right sides within FIG. 1 in directions perpendicular to the vibrating arms 11a, 11b for detection. The piezoelectric vibrating gyro element 8 further has pairs of left and right vibrating arms 14a, 14b, 15a, 15b for driving extended out of the tip portions of the respective connecting arms 13a, 13b on both the upper and lower sides within FIG. 1 in parallel with the vibrating arms 11a, 11b for detection. Thus, the vibrating arms 14a, 14b, 15a, 15b for driving and the connecting arms 13a, 13b are arranged so as to form line symmetry with respect to the Y-axis passing through the gravity center G of the piezoelectric vibrating gyro element 8.

Further, unillustrated detecting electrodes are formed on the surfaces of the vibrating arms 11a, 11b for detection. Unillustrated driving electrodes are formed on the surfaces of the vibrating arms 14a, 14b, 15a, 15b for driving. Thus, a detecting vibrating system for detecting an angular velocity is constructed by the vibrating arms 11a, 11b for detection. A driving vibrating system for operating the piezoelectric vibrating gyro element 8 is constructed by the connecting arms 13a, 13b and the vibrating arms 14a, 14b, 15a, 15b for driving.

The piezoelectric vibrating gyro element 8 can detect the angular velocity by supporting the gravity center G of the base portion 10.

A driving vibrating state and a detecting vibrating state in such a piezoelectric vibrating gyro element 8 will next be explained.

Figure 2:
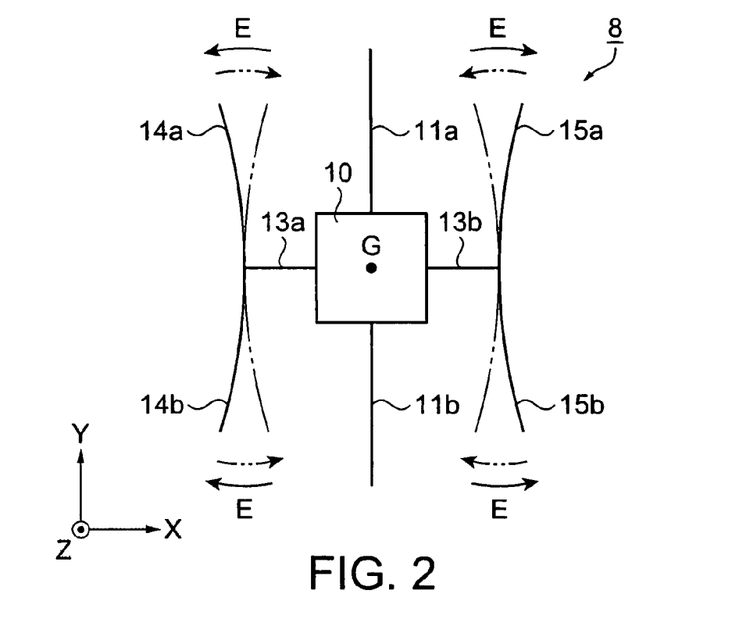
FIG. 2 is a typical plan view for explaining a driving vibrating state of the piezoelectric vibrating gyro element.
Figure 3:
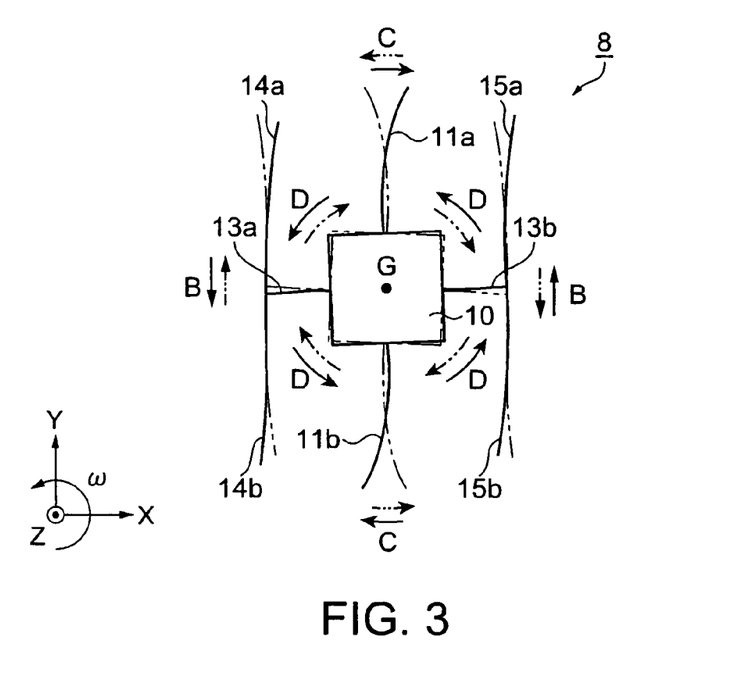
FIG. 3 is a typical plan view for explaining a detecting vibrating state of the piezoelectric vibrating gyro element.

FIG. 2 is a typical plan view for explaining the driving vibrating state of the piezoelectric vibrating gyro element 8. FIG. 3 is a typical plan view for explaining the detecting vibrating state of the piezoelectric vibrating gyro element 8. In FIGS. 2 and 3, each vibrating arm is shown by a line to simply express a vibrating mode.

In FIG. 2, in a state in which no angular velocity is applied to the piezoelectric vibrating gyro element 8, the vibrating arms 14a, 14b, 15a, 15b for driving perform a bending vibration in the direction shown by an arrow E. In this bending vibration, a vibrating mode shown by a solid line and a vibrating mode shown by a two-dotted chain line are repeated at a predetermined frequency. At this time, the vibrating arms 14a, 14b for driving and the vibrating arms 15a, 15b for driving perform the vibration of the line symmetry with respect to the Y-axis passing through the gravity center G. Therefore, the base portion 10, the connecting arms 13a, 13b and the vibrating arms 11a, 11b for detection are almost not vibrated.

In a state in which this driving vibration is performed, the vibration as shown in FIG. 3 is performed when the angular velocity ω around the Z-axis is applied to the piezoelectric vibrating gyro element 8. Namely, Coriolis force of the direction of an arrow B is applied to the vibrating arms 14a, 14b, 15a, 15b for driving and the connecting arms 13a, 13b constituting the driving vibrating system, and a new vibration is excited. This vibration of the arrow B direction is a circumferential vibration with respect to the gravity center G. Simultaneously, in the vibrating arms 11a, 11b for detection, a detecting vibration of the direction of an arrow C is excited in accordance with the vibration of the arrow B. The detecting electrodes formed in the vibrating arms 11a, 11b for detection detect the distortion of a piezoelectric material generated by this detecting vibration, and the angular velocity is calculated.

At this time, a peripheral portion of the base portion 10 is vibrated in the circumferential direction with respect to the gravity center G in the direction of an arrow D. This is because the detecting vibration becomes a balance vibration including the base portion 10 as well as a balance vibration of the driving vibrating system and the vibrating arms 11a, 11b for detection. The vibrating amplitude of the peripheral portion of the base portion 10 shown by this arrow D is very small in comparison with the vibrating amplitude of the driving vibrating system shown by the arrow B, or the vibrating amplitudes of the vibrating arms 11a, 11b for detection shown by the arrow C.

Thus, the vibrations of the vibrating arms 11a, 11b for detection are influenced by the vibrations of the connecting arms 13a, 13b and the base portion 10.

In the above piezoelectric vibrating gyro element 8, it is necessary to increase the vibrating amplitude of the detecting vibration and increase a flexure displacing amount of the vibrating arms 11a, 11b for detection so as to raise detecting sensitivity of the angular velocity. It is known that it is sufficient to conform the frequencies of the vibrating arms 11a, 11b for detection to the frequencies of the vibrating arms 14a, 14b, 15a, 15b for driving so as to maximize the amplitude of the detecting vibration due to the Coriolis force.

However, only one portion of the driving vibration is also really transmitted to the base portion 10 as micro leakage even when no Coriolis force is applied. When the driving frequencies of the vibrating arms 14a, 14b, 15a, 15b for driving and the detecting frequencies of the vibrating arms 11a, 11b for detection are set to be equal to each other, this leak component is easily collected. Therefore, the respective frequencies are normally designed so as to be shifted by about 1000 Hz.

The driving frequency of the piezoelectric vibrating gyro element is desirably practically set within a range from 20 kHz to 120 kHz. This is because the piezoelectric vibrating gyro element is easily made compact but a reduction in the detecting sensitivity of the angular velocity and an increase in electric power consumption are expected when the driving frequency is set to 120 kHz or more. This is also because the detecting sensitivity of the angular velocity is improved but the piezoelectric vibrating gyro element is large-sized when the driving frequency is set to 20 kHz or less.

Figure 4A:
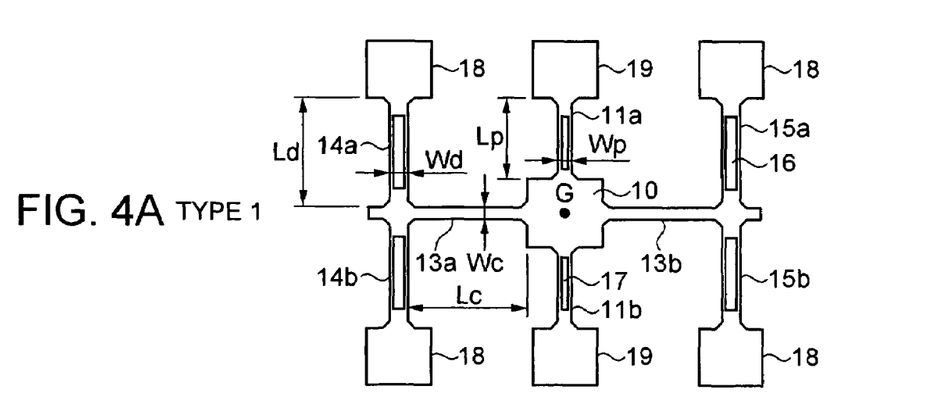
FIGS. 4A and 4B are schematic plan views showing types of the piezoelectric vibrating gyro element.
Figure 4B:
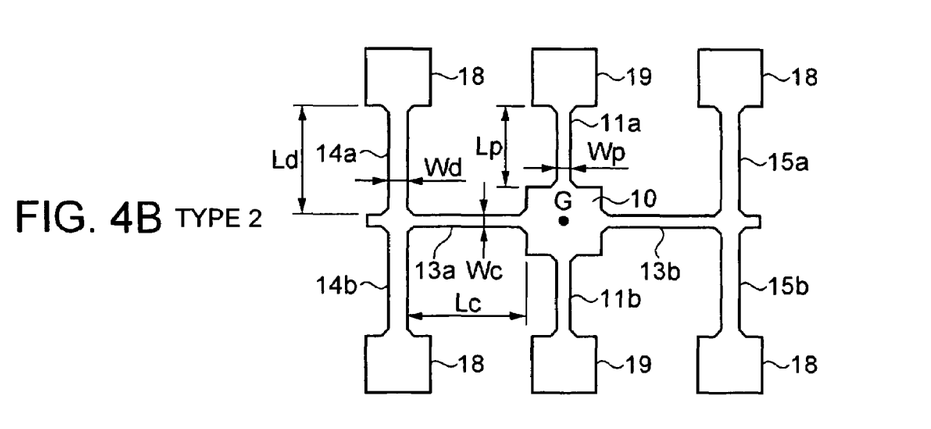
Figure 5A:
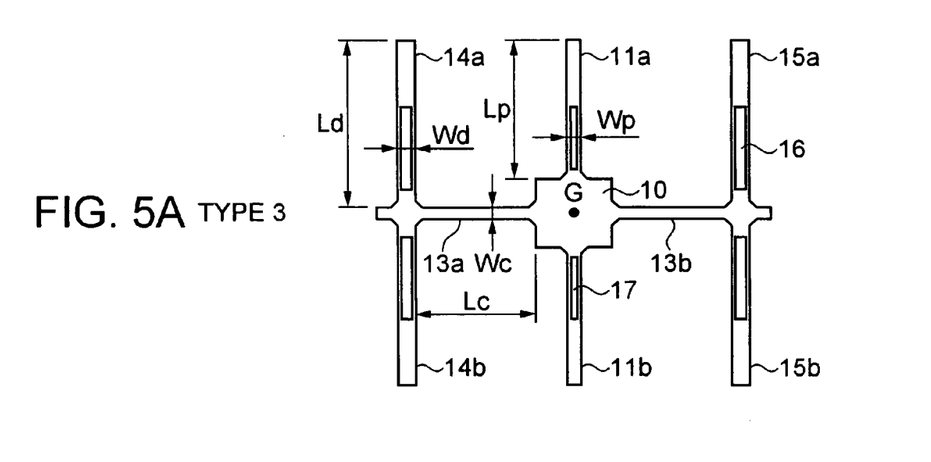
FIGS. 5A to 5C are schematic plan views showing types of the piezoelectric vibrating gyro element.
Figure 5B:
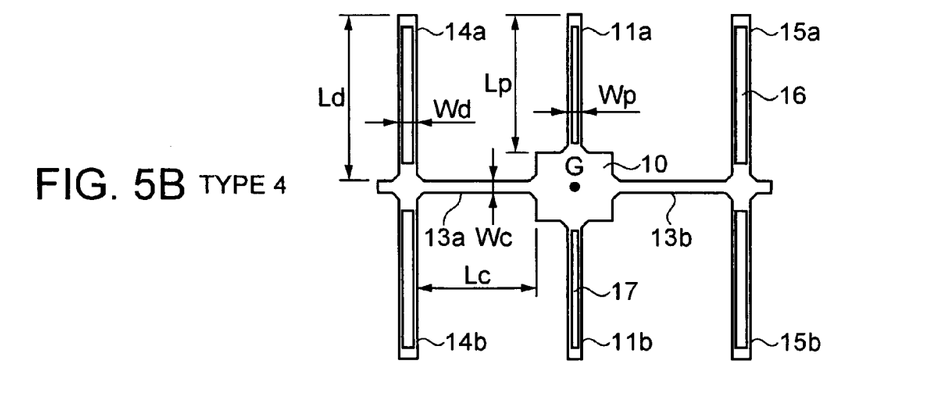
Figure 5C:
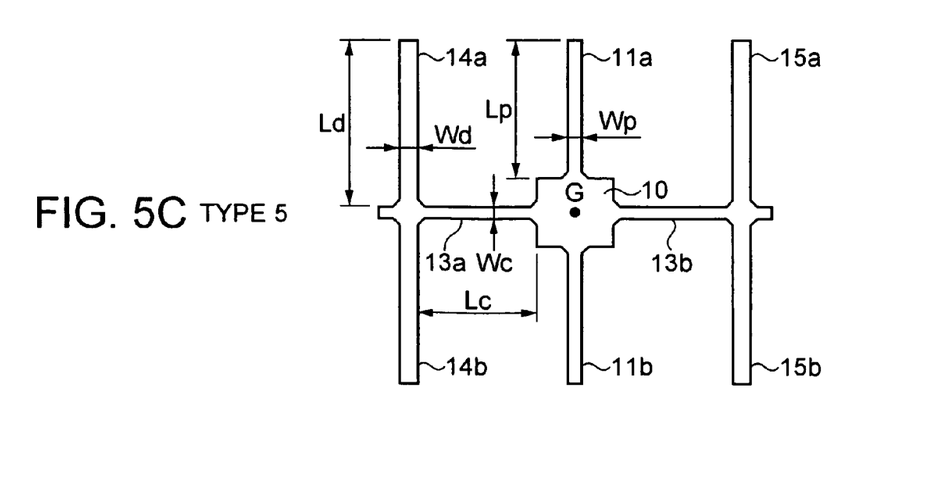

The present inventors have noticed that the length and width of each vibrating arm relate to each vibrating frequency, and have found the relation of the length and width of each vibrating arm able to obtain preferable characteristics as the piezoelectric vibrating gyro element. The piezoelectric vibrating gyro elements of five types have been considered in analyzing this relation of the length and width of each vibrating arm. FIGS. 4 and 5 are schematic plan views showing the piezoelectric vibrating gyro elements of these five types. In the views used in the following explanation, the same reference numerals are designated in portions of the same functions as the piezoelectric vibrating gyro element of FIG. 1, and their explanations are omitted.

FIG. 4A shows the piezoelectric vibrating gyro element of type 1, and a weight portion 18 is arranged at the tip of each of the vibrating arms 14a, 14b, 15a, 15b for driving, and a groove portion 16 is formed in each of the vibrating arms 14a, 14b, 15a, 15b for driving. Similarly, a weight portion 19 is arranged at the tip of each of the vibrating arms 11a, 11b for detection, and a groove portion 17 is formed in each of the vibrating arms 11a, 11b for detection.

FIG. 4B shows the piezoelectric vibrating gyro element of type 2, and shows a mode in which no groove portion is arranged in the vibrating arms 14a, 14b, 15a, 15b for driving and the vibrating arms 11a, 11b for detection in type 1.

FIG. 5A shows the piezoelectric vibrating gyro element of type 3, and shows a mode in which groove portions 16, 17 are respectively arranged in the vibrating arms 14a, 14b, 15a, 15b for driving and the vibrating arms 11a, 11b for detection at lengths of about half the respective vibrating arms.

FIG. 5B shows the piezoelectric vibrating gyro element of type 4, and shows a mode in which groove portions 16, 17 are respectively arranged in the vibrating arms 14a, 14b, 15a, 15b for driving and the vibrating arms 11a, 11b for detection until the vicinity of the tip of each vibrating arm.

FIG. 5C shows the piezoelectric vibrating gyro element of type 5, and shows a mode in which no groove portions of types 3 and 4 are arranged.

In the above piezoelectric vibrating gyro elements of the five types, the following relation formula (1) is formed when the vibrating arms 14a, 14b, 15a, 15b for driving are set to fd in driving frequency, Ld in length and Wd in width.

$$fd = Cd \times Wd/Ld^2 \quad (1)$$

The following relation formula (2) is formed when the vibrating arms 11a, 11b for detection are set to fp in detecting frequency, Lp in length and Wp in width.

$$fp = Cp \times Wp/Lp^2 \quad (2)$$

The following relation formula (3) is formed when the connecting arms 13a, 13b are set to fc in vibrating frequency, Lc in length and Wc in width.

$$fc = Cc \times Wc/Lc^2 \quad (3)$$

Cd, Cp and Cc are constants determined from inertia moment, an elastic constant and the density of a material of each vibrating arm, etc. and have different values in accordance with the piezoelectric vibrating gyro elements of the respective types.

Figure 6:
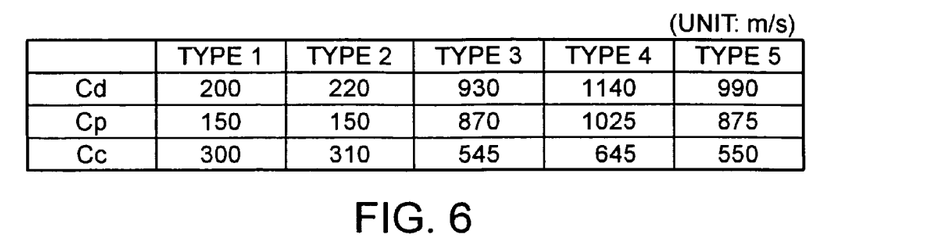
FIG. 6 is a table showing constant values in the piezoelectric vibrating gyro elements of five types.

When these constants Cd, Cp and Cc are calculated with respect to the piezoelectric vibrating gyro elements of the respective types, these constants have the values as shown in FIG. 6.

For example, when the driving vibrating frequency lies within a range from 20 kHz to 120 kHz, the following formula (4) is formed.

$$20000 \text{ (Hz)} \leq fd \leq 120000 \text{ (Hz)} \quad (4)$$

The value of $Wd/Ld^2$ is determined from this formula (4), the formula (1) and the values of Cd shown in FIG. 6. Similarly, the value of $Wp/Lp^2$ and the value of $Wc/Lc^2$ can be calculated. In addition, m is used as the unit of Wd, Wp, Wc and Ld, Lp, Lc.

When these values are calculated in the piezoelectric vibrating gyro elements of the respective types, the following results are derived.

Piezoelectric vibrating gyro element of type 1

$$100 \leq Wd/Ld^2 \leq 580 \quad (5)$$

$$135 \leq Wp/Lp^2 \leq 800 \quad (6)$$

$$65 \leq Wc/Lc^2 \leq 390 \quad (7)$$

Piezoelectric vibrating gyro element of type 2

$$90 \leq Wd/Ld^2 \leq 540 \quad (8)$$

$$135 \leq Wp/Lp^2 \leq 790 \quad (9)$$

$$65 \leq Wc/Lc^2 \leq 380 \quad (10)$$

Piezoelectric vibrating gyro element of type 3

$$22 \leq Wd/Ld^2 \leq 125 \quad (11)$$

$$23 \leq Wp/Lp^2 \leq 135 \quad (12)$$

$$37 \leq Wc/Lc^2 \leq 215 \quad (13)$$

Piezoelectric vibrating gyro element of type 4

$$18 \leq Wd/Ld^2 \leq 105 \quad (14)$$

$$20 \leq Wp/Lp^2 \leq 115 \quad (15)$$

$$32 \leq Wc/Lc^2 \leq 185 \quad (16)$$

Piezoelectric vibrating gyro element of type 5

$$20 \leq Wd/Ld^2 \leq 120 \quad (17)$$

$$23 \leq Wp/Lp^2 \leq 135 \quad (18)$$

$$37 \leq Wc/Lc^2 \leq 215 \quad (19)$$

Embodiment modes for embodying the invention will next be explained in accordance with the drawings.

FIRST EMBODIMENT MODE

Figure 7:
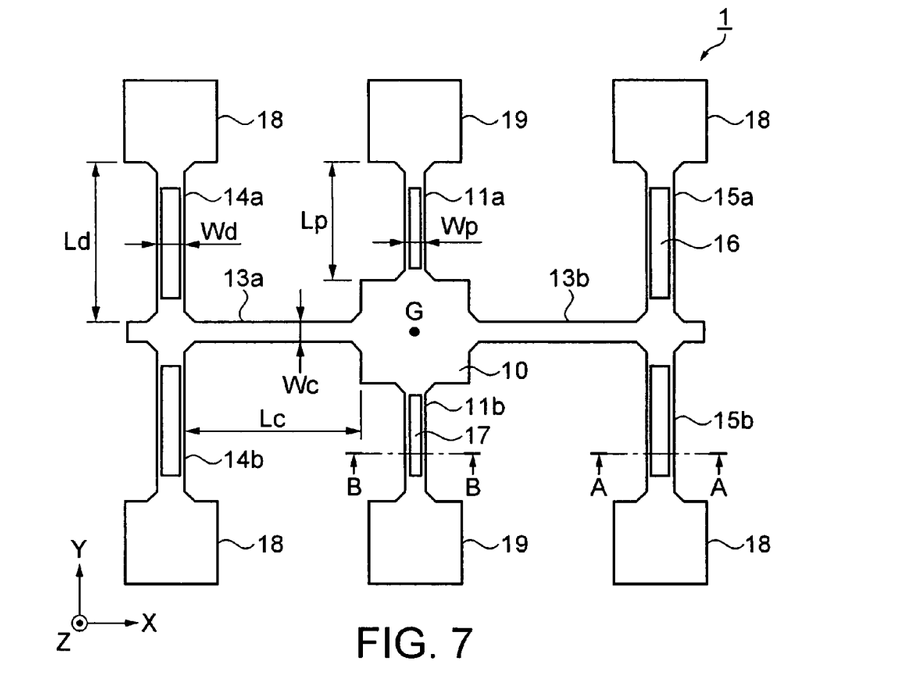
FIG. 7 is a schematic plan view showing the piezoelectric vibrating gyro element of this embodiment mode.

FIG. 7 is a schematic plan view showing the piezoelectric vibrating gyro element of type 1 in this embodiment mode.

The piezoelectric vibrating gyro element 1 is formed by crystal as a piezoelectric material. The crystal has an X-axis (electric axis), a Y-axis (mechanical axis) and a Z-axis (optical axis). This piezoelectric vibrating gyro element 1 has a predetermined thickness in the Z-axis direction of the crystal, and is formed within an XY plane.

The piezoelectric vibrating gyro element 1 has a pair of vibrating arms 11a, 11b for detection extended out of a base portion 10 in a straight line shape on both the upper and lower sides within FIG. 7, and also has a pair of connecting arms 13a, 13b extended out of the base portion 10 on both the left and right sides within FIG. 7 in directions perpendicular to the vibrating arms 11a, 11b for detection. The piezoelectric vibrating gyro element 1 further has pairs of respective left and right vibrating arms 14a, 14b, 15a, 15b for driving extended out of the tip portions of the respective connecting arms 13a, 13b on both the upper and lower sides within FIG. 7 in parallel with the vibrating arms 11a, 11b for detection. Thus, the vibrating arms 14a, 14b, 15a, 15b for driving and the connecting arms 13a, 13b are arranged so as to form line symmetry with respect to the Y-axis passing through the gravity center G of the piezoelectric vibrating gyro element 1.

Weight portions 18, 19 are respectively formed at the tips of the vibrating arms 14a, 14b, 15a, 15b for driving and the vibrating arms 11a, 11b for detection. The generated Coriolis force can be increased by arranging these weight portions 18, 19.

Further, groove portions 16, 17 are respectively formed in the vibrating arms 14a, 14b, 15a, 15b for driving and the vibrating arms 11a, 11b for detection. Electricity-machine converting efficiency can be improved and the detecting sensitivity of the angular velocity can be improved by arranging these groove portions 16, 17.

Further, the piezoelectric vibrating gyro element 1 can be made compact by arranging the weight portions 18, 19 and the groove portions 16, 17.

Figure 8A:
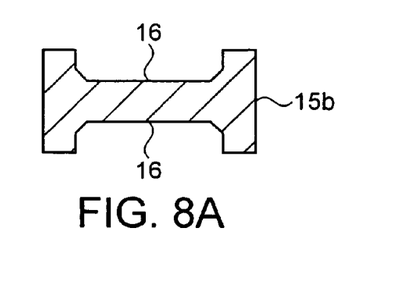
FIG. 8A is a cross-sectional view showing the shape of a groove portion of a vibrating arm for driving.
Figure 8B:
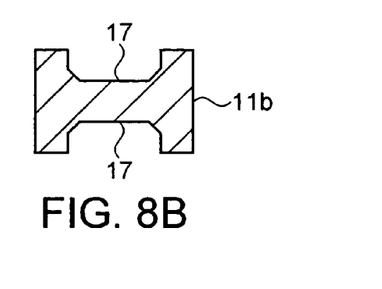
FIG. 8B is a cross-sectional view showing the shape of a groove portion of a vibrating arm for detection.

FIG. 8 shows cross-sectional views of these groove portions 16, 17. FIG. 8A is a cross-sectional view along a cutting line A-A of FIG. 7. FIG. 8B is a cross-sectional view along a cutting line B-B of FIG. 7.

In FIG. 8A, in the vibrating arm 15b for driving, the groove portion 16 is formed from both faces in the thickness direction. Similar groove portions 16 are also formed in the other vibrating arms 14a, 14b, 15a for driving.

In FIG. 8B, in the vibrating arm 11b for detection, the groove portion 17 is formed from both faces in the thickness direction. A similar groove portion 17 is also formed in the other vibrating arm 11a for detection.

Further, unillustrated detecting electrodes are formed on the surfaces of the vibrating arms 11a, 11b for detection. Unillustrated driving electrodes are formed on the surfaces of the vibrating arms 14a, 14b, 15a, 15b for driving. The vibrating arms 14a, 14b, 15a, 15b for driving are bent-vibrated by applying an electric field to this driving electrode, and distortion generated in the vibrating arms 11a, 11b for detection is detected by the detecting electrode and the angular velocity can be detected.

In this piezoelectric vibrating gyro element 1, the length and width of each vibrating arm are set so as to satisfy the above formulas (5), (6) and (7). Concretely, the vibrating arms 14a, 14b, 15a, 15b for driving are set to about 650 μm in length Ld and about 100 μm in width Wd. The vibrating arms 11a, 11b for detection are set to about 500 μm in length Lp and about 75 μm in width Wp. The connecting arms 13a, 13b are set to about 650 μm in length Lc and about 70 μm in width Wc. Further, the groove portions 16 of the vibrating arms 14a, 14b, 15a, 15b for driving are set to about 425 μm in length and about 70 μm in width. The groove portions 17 of the vibrating arms 11a, 11b for detection are set to about 315 μm in length and about 45 μm in width.

Modified Examples of Piezoelectric Vibrating Gyro Element of Type 1

Figure 9:
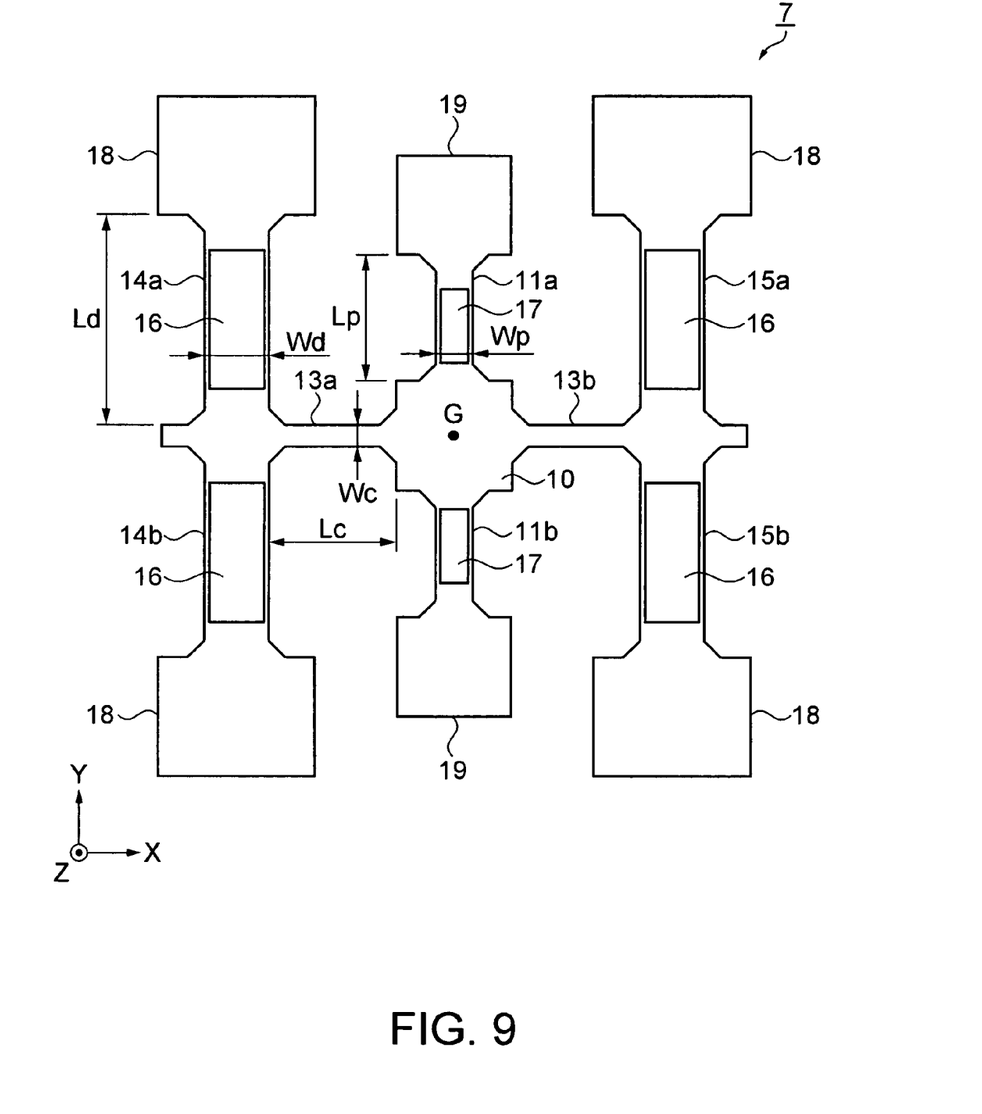
FIG. 9 is a schematic plan view showing a modified example of the piezoelectric vibrating gyro element of this embodiment mode.

FIG. 9 is a schematic plan view showing a modified example of the piezoelectric vibrating gyro element of type 1.

In a piezoelectric vibrating gyro element 7, the length and width of each vibrating arm are set so as to satisfy the above formulas (5), (6) and (7). Concretely, the vibrating arms 14a, 14b, 15a, 15b for driving are set to about 600 μm in length Ld and about 160 μm in width Wd. The vibrating arms 11a, 11b for detection are set to about 420 μm in length Lp and about 90 μm in width Wp. The connecting arms 13a, 13b are set to about 400 μm in length Lc and about 60 μm in width Wc. Further, the groove portions 16 of the vibrating arms 14a, 14b, 15a, 15b for driving are set to about 400 μm in length and about 130 μm in width. The groove portions 17 of the vibrating arms 11a, 11b for detection are set to about 200 μm in length and about 70 μm in width.

Thus, the piezoelectric vibrating gyro element 7 can be also made compact by thickly setting the widths of the vibrating arms 14a, 14b, 15a, 15b for driving, and shortly setting the lengths Lc of the connecting arms 13a, 13b, and further shortly setting the lengths Lp of the vibrating arms 11a, 11b for detection in comparison with the first embodiment mode.

SECOND EMBODIMENT MODE

Figure 10:
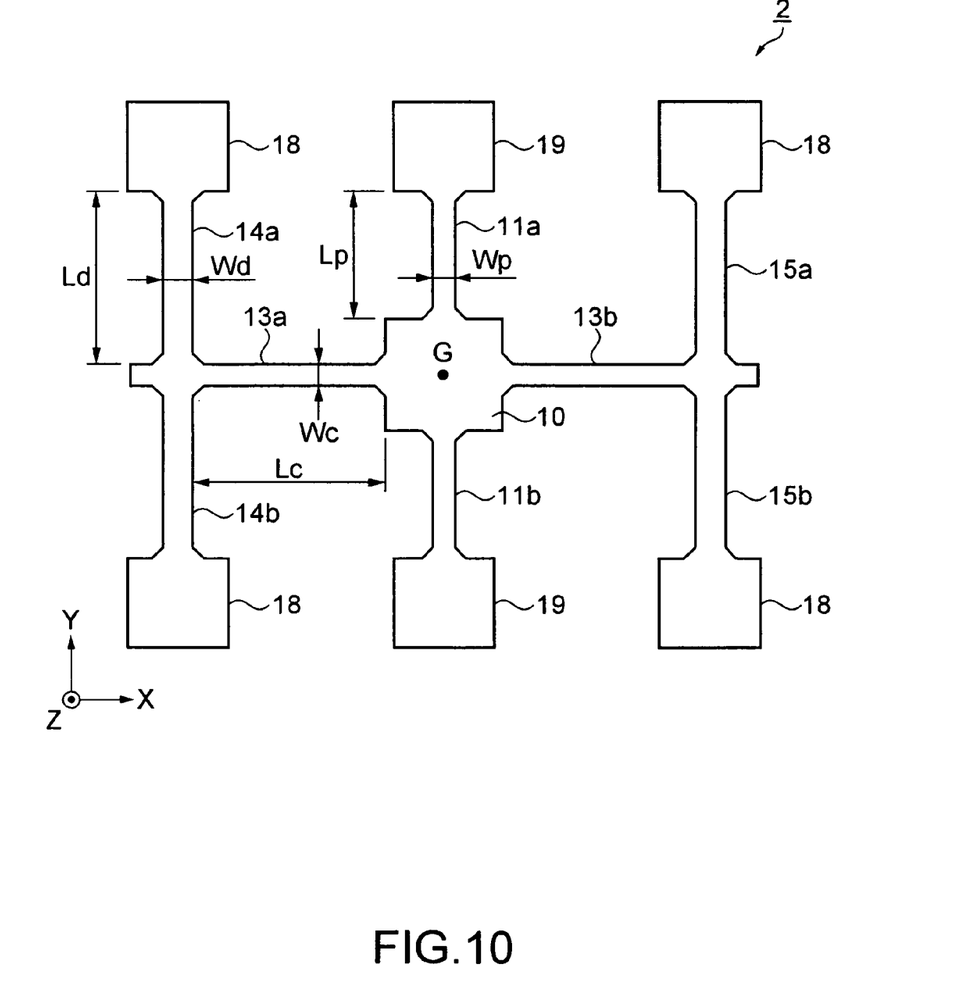
FIG. 10 is a schematic plan view showing the piezoelectric vibrating gyro element of this embodiment mode.

FIG. 10 is a schematic plan view showing the piezoelectric vibrating gyro element of type 2 in this embodiment mode. This piezoelectric vibrating gyro element 2 shows a mode in which no groove portion is arranged in the vibrating arm for driving and the vibrating arm for detection in the above piezoelectric vibrating gyro element 1 of type 1.

In the piezoelectric vibrating gyro element 2, the length and width of each vibrating arm are set so as to satisfy the above formulas (8), (9) and (10). Concretely, the vibrating arms 14a, 14b, 15a, 15b for driving are set to about 650 μm in length Ld and about 100 μm in width Wd. The vibrating arms 11a, 11b for detection are set to about 500 μm in length Lp and about 75 μm in width Wp. The connecting arms 13a, 13b are set to about 650 μm in length Lc and about 70 μm in width Wc.

THIRD EMBODIMENT MODE

Figure 11:
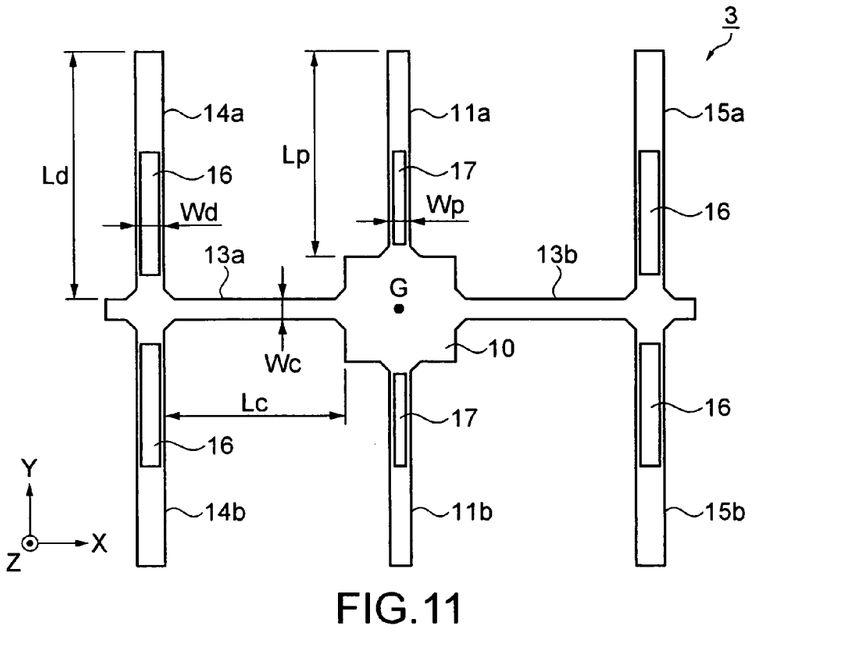
FIG. 11 is a schematic plan view showing the piezoelectric vibrating gyro element of this embodiment mode.

FIG. 11 is a schematic plan view showing the piezoelectric vibrating gyro element of type 3 in this embodiment mode. This piezoelectric vibrating gyro element 3 shows a mode in which no weight portion is arranged in the vibrating arm for driving and the vibrating arm for detection in the above piezoelectric vibrating gyro element 1 of type 1.

In this piezoelectric vibrating gyro element 3, the length and width of each vibrating arm are set so as to satisfy the above formulas (11), (12) and (13). Concretely, the vibrating arms 14a, 14b, 15a, 15b for driving are set to about 1000 μm in length Ld and about 100 μm in width Wd. The vibrating arms 11a, 11b for detection are set to about 850 μm in length Lp and about 75 μm in width Wp. The connecting arms 13a, 13b are set to about 650 μm in length Lc and about 70 μm in width Wc. Further, the groove portions 16 of the vibrating arms 14a, 14b, 15a, 15b for driving are set to about 425 μm in length and about 70 μm in width. The groove portions 17 of the vibrating arms 11a, 11b for detection are set to about 315 μm in length and about 45 μm in width.

FOURTH EMBODIMENT MODE

Figure 12:
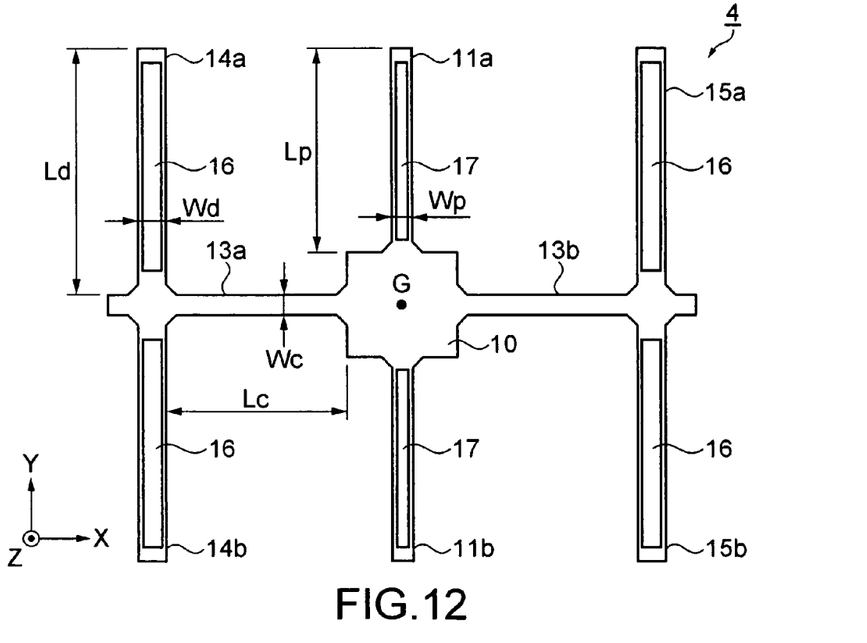
FIG. 12 is a schematic plan view showing the piezoelectric vibrating gyro element of this embodiment mode.

FIG. 12 is a schematic plan view showing the piezoelectric vibrating gyro element of type 4 in this embodiment mode. This piezoelectric vibrating gyro element 4 shows a mode in which the groove portions formed in the vibrating arm for driving and the vibrating arm for detection are extended until the vicinity of their tips in the above piezoelectric vibrating gyro element 3 of type 3.

In this piezoelectric vibrating gyro element 4, the length and width of each vibrating arm are set so as to satisfy the above formulas (14), (15) and (16). Concretely, the vibrating arms 14a, 14b, 15a, 15b for driving are set to about 1000 μm in length Ld and about 100 μm in width Wd. The vibrating arms 11a, 11b for detection are set to about 850 μm in length Lp and about 75 μm in width Wp. The connecting arms 13a, 13b are set to about 650 μm in length Lc and about 70 μm in width Wc. Further, the groove portions 16 of the vibrating arms 14a, 14b, 15a, 15b for driving are set to about 850 μm in length and about 70 μm in width. The groove portions 17 of the vibrating arms 11a, 11b for detection are set to about 700 μm in length and about 45 μm in width.

FIFTH EMBODIMENT MODE

Figure 13:
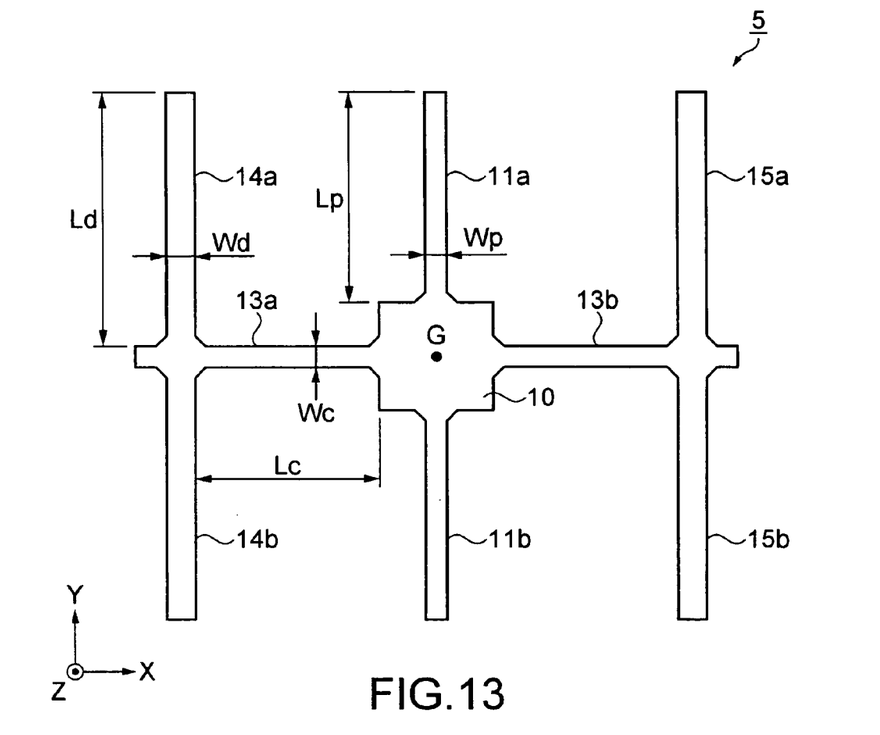
FIG. 13 is a schematic plan view showing the piezoelectric vibrating gyro element of this embodiment mode.

FIG. 13 is a schematic plan view showing the piezoelectric vibrating gyro element of type 5 in this embodiment mode. This piezoelectric vibrating gyro element 5 shows a mode in which no groove portion is arranged in the vibrating arm for driving and the vibrating arm for detection in the above piezoelectric vibrating gyro element 3 of type 3.

In this piezoelectric vibrating gyro element 5, the length and width of each vibrating arm are set so as to satisfy the above formulas (17), (18) and (19). Concretely, the vibrating arms 14a, 14b, 15a, 15b for driving are set to about 1000 μm in length Ld and about 100 μm in width Wd. The vibrating arms 11a, 11b for detection are set to about 850 μm in length Lp and about 75 μm in width Wp. The connecting arms 13a, 13b are set to about 650 μm in length Lc and about 70 μm in width Wc.

The operations of the piezoelectric vibrating gyro elements 1, 2, 3, 4, 5, 7 explained above are similar to those explained in FIGS. 2 and 3, and their explanations are therefore omitted.

As mentioned above, in each type of the piezoelectric vibrating gyro element, the piezoelectric vibrating gyro element for easily obtaining preferable characteristics can be provided by setting the length and width of each vibrating arm so as to satisfy the above formulas (5) to (19). Further, when the piezoelectric vibrating gyro element is made compact, the piezoelectric vibrating gyro element can be easily designed.

SIXTH EMBODIMENT MODE

Figure 14:
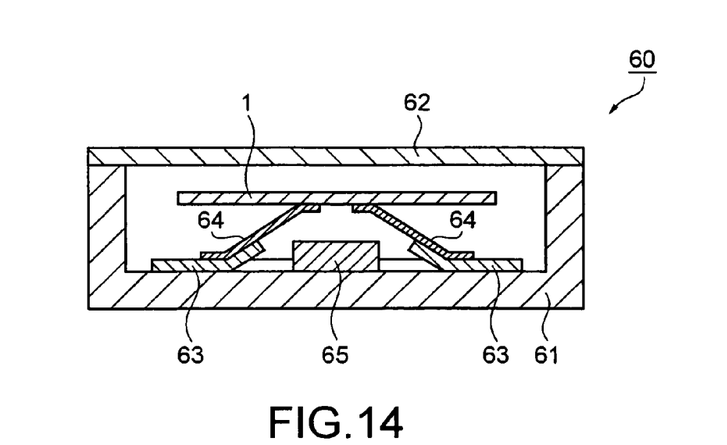
FIG. 14 is a schematic sectional view showing the construction of a gyro sensor of this embodiment mode.

FIG. 14 is a schematic sectional view showing the construction of a gyro sensor in this embodiment mode.

The gyro sensor 60 has the piezoelectric vibrating gyro element 1, a storing container 61, a cover body 62, a support substrate 63, a lead plate 64 and an IC 65. The IC 65 is arranged in the bottom portion of the storing container 61 formed by ceramic, etc., and is mounted by e.g., a face down system. The IC 65 includes a driving circuit for operating and vibrating the piezoelectric vibrating gyro element 1, and a detecting circuit for detecting the detecting vibration caused in the piezoelectric vibrating gyro element 1 when the angular velocity is applied.

The central portion (base portion) of the piezoelectric vibrating gyro element 1 is supported by the lead plate 64, and the lead plate 64 is fixed to the support substrate 63 arranged in the bottom portion of the storing container 61. The interior of the storing container 61 is held in the atmosphere of a vacuum in the upper portion of the storing container 61, and is sealed by the cover body 62.

Thus, in accordance with the gyro sensor 60 of this embodiment mode, it is possible to provide a gyro sensor mounting the above piezoelectric vibrating gyro element and able to preferably detect the angular velocity. In particular, if the piezoelectric vibrating gyro element made compact is mounted, it is possible to obtain a gyro sensor having preferable characteristics and made compact.

The piezoelectric vibrating gyro element of this embodiment mode can be integrally formed by etching processing using a photolithography technique, and many piezoelectric vibrating gyro elements can be formed from one crystal wafer.

Further, in this embodiment mode, the mode of the piezoelectric vibrating gyro element for supporting the base portion has been explained. However, it is also possible to embody a construction in which the beam is extended out of the base portion and the support portion is arranged so as to support its tip portion.

The entire disclosure of Japanese Patent Application No. 2005-015457, filed Jan. 24, 2005 is expressly incorporated by reference herein.

What is claimed is:

1. A piezoelectric vibrating gyro element constructed of a crystal material comprising at least in the same plane:

a base portion having opposite sides and ends respectively;

a pair of vibrating arms for detection extending out from the opposite ends of said base portion in a straight line, and having groove portions;

a weight portion connected to a tip of each of the vibrating arms for detection;

a pair of connecting arms extending out from each side of the base portion in directions perpendicular to the vibrating arms for detection;

additional pairs of vibrating arms for driving with each pair extending out from a tip portion of each of the connecting arms in a direction perpendicular to the tip portion, and having groove portions; and a weight portion connected to a tip of each of the additional vibrating arms for driving;

wherein, when each vibrating arm for driving is set to Ld in length and Wd in width, and each additional vibrating arm for detection is set to Lp in length and Wp in width, and said the connecting arms are set to Lc in length and Wc in width, the piezoelectric vibrating gyro element is constructed to conform in relationship to the following formulas $100 \leq Wd/Ld^2 \leq 580$ $135 \leq Wp/Lp^2 \leq 800$ $65 \leq Wc/Lc^2 \leq 390.$ 2. A piezoelectric vibrating gyro element constructed of a piezoelectric crystal material comprising at least in the same plane:

a base portion having opposite sides and ends respectively;

a pair of vibrating arms for detection extending out from the opposite ends of said base portion in a straight line;

a weight portion connected to a tip of each of the vibrating arms for detection;

a pair of connecting arms extending out from each side of the base portion in directions perpendicular to the vibrating arms for detection;

additional pairs of vibrating arms for driving with each pair extending out from a tip portion of each of the connecting arms in a direction perpendicular to the tip portion; and a weight portion connected to the tip portion of each of the vibrating arms for driving;

wherein, when each vibrating arm for driving is set to Ld in length and Wd in width, and each additional vibrating arm for detection is set to Lp in length and Wp in width, and said connecting arms are set to Lc in length and Wc in width, the piezoelectric vibrating gyro element is constructed to conform in relationship to the following formulas:

$90 \leq Wd/Ld^2 \leq 540$ $135 \leq Wp/Lp^2 \leq 790$ $65 \leq Wc/Lc^2 \leq 380.$ 3. A piezoelectric vibrating gyro element constructed of a piezoelectric crystal material comprising at least in the same plane:

a base portion having a given length with opposite sides and ends respectively;

a pair of vibrating arms for detection extending out from the opposite ends of said base portion in a straight line, and having groove portions of lengths of about half the length of the base portion;

a pair of connecting arms extending out from each side of the base portion in directions perpendicular to the vibrating arms for detection; and additional pairs of vibrating arms for driving with each pair extending out from a tip portion of each of the connecting arms in a direction perpendicular to the tip portion with each tip portion having a given length and with the additional pairs of vibrating arms having groove portions of lengths of about half the length of the tip portion;

wherein, when each vibrating arm for driving is set to Ld in length and Wd in width, and each additional vibrating arm for detection is set to Lp in length and Wp in width, and said connecting arms are set to Lc in length and Wc in width, the piezoelectric vibrating gyro element is constructed to conform in relationship to the following formulas:

$22 \leq Wd/Ld^2 \leq 125$ $23 \leq Wp/Lp^2 \leq 135$ $37 Wc/Lc^2 \leq 215.$

4. A piezoelectric vibrating gyro element constructed of a piezoelectric crystal material comprising at least in the same plane:

a base portion having a given length with opposite sides and ends respectively;

a pair of vibrating arms for detection extending out from the opposite ends of said base portion in a straight line, and having groove portions extended to a tip portion;

a pair of connecting arms extending out from each side of the base portion in directions perpendicular to the vibrating arms for detection; and additional pairs of vibrating arms for driving with each pair extending out from a tip portion of each of the connecting arms in a direction perpendicular to the tip portion; and wherein, when each vibrating arm for driving is set to Ld in length and Wd in width, and each additional vibrating arm for detection is set to Lp in length and Wp in width, and said connecting arms are set to Lc in length and Wc in width, the piezoelectric vibrating gyro element is constructed to conform in relationship to the following formulas:

$18 \leq Wd/Ld^2 \leq 105$ $20 \leq Wp/Lp^2 \leq 115$ $32 \leq Wc/Lc^2 \leq 185.$ 5. A piezoelectric vibrating gyro element constructed of a piezoelectric crystal material comprising at least in the same plane:

a base portion having opposite sides and ends respectively;

a pair of vibrating arms for detection extending out from the opposite ends of said base portion in a straight line;

a pair of connecting arms extending out from each side of the base portion in directions perpendicular to the vibrating arms for detection; and additional pairs of vibrating arms for driving with each pair extending out from a tip portion of each of the connecting arms in a direction perpendicular to the tip portion; and wherein, when each vibrating arm for driving is set to Ld in length and Wd in width, and each additional vibrating arm for detection is set to Lp in length and Wp in width, and said connecting arms are set to Lc in length and Wc in width, the piezoelectric vibrating gyro element is constructed to conform in relationship to the following formulas:

$20 \leq Wd/Ld^2 \leq 120$ $23 \leq Wp/Lp^2 \leq 135$ $37 \leq Wc/Lc^2 \leq 215.$ 6. A gyro sensor comprising:

the piezoelectric vibrating gyro element according to claim 1;

a driving circuit for operating and vibrating the piezoelectric vibrating gyro element; and a detecting circuit for detecting vibrations caused in the piezoelectric vibrating gyro element when an angular velocity is applied to the piezoelectric vibrating gyro element.

7. A gyro sensor comprising:

the piezoelectric vibrating gyro element according to claim 2;

a driving circuit for operating and vibrating the piezoelectric vibrating gyro element; and a detecting circuit for detecting vibrations caused in the piezoelectric vibrating gyro element when an angular velocity is applied to the piezoelectric vibrating gyro element.

8. A gyro sensor comprising:

the piezoelectric vibrating gyro element according to claim 3;

a driving circuit for operating and vibrating the piezoelectric vibrating gyro element; and a detecting circuit for detecting vibrations caused in the piezoelectric vibrating gyro element when an angular velocity is applied to the piezoelectric vibrating gyro element.

9. A gyro sensor comprising:

the piezoelectric vibrating gyro element according to claim 4;

a driving circuit for operating and vibrating the piezoelectric vibrating gyro element; and a detecting circuit for detecting vibrations caused in the piezoelectric vibrating gyro element when an angular velocity is applied to the piezoelectric vibrating gyro element.

10. A gyro sensor comprising:

the piezoelectric vibrating gyro element according to claim 5;

a driving circuit for operating and vibrating the piezoelectric vibrating gyro element; and a detecting circuit for detecting vibrations caused in the piezoelectric vibrating gyro element when an angular velocity is applied to the piezoelectric vibrating gyro element.

* * * * *